(12) United States Patent
Hoffert et al.

(10) Patent No.: US 7,995,145 B2
(45) Date of Patent: Aug. 9, 2011

(54) INLINE AUDIO/VISUAL CONVERSION

(75) Inventors: Bradley W. Hoffert, San Jose, CA (US);
Susanna E. Hoffert, San Jose, CA (US);
Steven L. Kelsey, Sunnyvale, CA (US);
James L. McPeak, Fremont, CA (US);
Oscar I. Medina, San Jose, CA (US);
Christopher E. Fitzpatrick, Morgan Hill, CA (US); Paul A. Wilcox, Sunnyvale, CA (US)

(73) Assignee: Locolabs, LLC, Sunnyvale, CA (US)

( * ) Notice: Subject to any disclaimer, the term of this patent is extended or adjusted under 35 U.S.C. 154(b) by 54 days.

(21) Appl. No.: 12/542,591

(22) Filed: Aug. 17, 2009

(65) Prior Publication Data
US 2009/0304069 A1    Dec. 10, 2009

Related U.S. Application Data

(62) Division of application No. 11/788,519, filed on Apr. 20, 2007, now Pat. No. 7,576,663.

(60) Provisional application No. 60/793,831, filed on Apr. 21, 2006.

(51) Int. Cl.
*H04N 3/27* (2006.01)
(52) U.S. Cl. .................. 348/554; 375/240.01
(58) Field of Classification Search .............. 341/50–90; 348/554, 730, 731, 734, 704, E3.049, E5.097, 348/E7.061, 14.09, 14.08, E7.083; 375/240.01, 375/240.2, 240.18, E7.226; 709/223, 245
See application file for complete search history.

(56) References Cited

U.S. PATENT DOCUMENTS

| 6,914,637 | B1 | 7/2005 | Wolf et al. |
| 7,283,566 | B2* | 10/2007 | Siemens et al. ............... 370/486 |
| 7,295,443 | B2 | 11/2007 | Mambakkam et al. |
| 7,334,132 | B1* | 2/2008 | Kumar et al. ................. 713/189 |
| 2004/0027103 | A1 | 2/2004 | Boylan |
| 2004/0080671 | A1 | 4/2004 | Siemens |
| 2004/0239816 | A1 | 12/2004 | Ando |
| 2005/0008323 | A1 | 1/2005 | Han |
| 2006/0036788 | A1 | 2/2006 | Galang |
| 2007/0298656 | A1 | 12/2007 | He |
| 2010/0020245 | A1* | 1/2010 | Kim .............................. 348/704 |
| 2010/0066805 | A1* | 3/2010 | Tucker et al. ............... 348/14.08 |
| 2010/0066808 | A1* | 3/2010 | Tucker et al. ............... 348/14.09 |

OTHER PUBLICATIONS

PCT/US07/09669, International Search Report and Written Opinion, mailed Mar. 7, 2008, 9 pgs total.
International Preliminary Report on Patentability from counterpart PCT Application No. PCT/US2007/009669 mailed Oct. 22, 2008 (5 pages).

\* cited by examiner

*Primary Examiner* — Lam T Mai
(74) *Attorney, Agent, or Firm* — Blakely, Sokoloff, Taylor & Zafman, LLP

(57) ABSTRACT

A system, method, and apparatus for inline audio/visual conversion are described. Power to an inline converter is provided over the A/V cable that couples the converter to a destination such as a selector.

6 Claims, 15 Drawing Sheets

INLINE AUDIO/VISUAL CONVERSION

CLAIM TO PRIORITY

This is a divisional application of U.S. Ser. No. 11/788,519, filed Apr. 20, 2007 now U.S. Pat. No. 7,576,663, and also claims the benefit of U.S. Provisional Application No. 60/793,831, filed Apr. 21, 2006.

FIELD OF INVENTION

The field of invention relates generally to the audio/visual (A/V) hardware, and, more specifically, to a converting analog or digital A/V streams into a single digital signal such as a High-Definition Multimedia Interface (HDMI) signal, converting a single digital signal into analog or digital A/V streams, and switching between multiple digital signals.

BACKGROUND

As digital displays such High-Definition Television (HDTV), Digital Television (DTV), and high resolution computer displays are becoming more common place, HDMI connections have become the desired way to bring A/V streams into digital displays as a HDMI cable carries both digital video and digital audio on a single cable.

However, most end-users will not also update all of their non-HDMI compatible legacy A/V devices (such as a set top box, video game console(s), VCR, DVR, DVD player, etc.). Rather, these users may need or want to convert the outputs from these devices from older analog interfaces, including composite, component, S-video, VGA, etc., to the newer HDMI standard. Even when the digital display supports the older interfaces, the physical nature of the device (e.g., flat panel mounted on a wall) may not make it easy or attractive to have multiple cables hanging from the display. Additionally, having multiple cables in close proximity can lead to the bleeding of signals from one cable to another causing interference in either the picture or audio.

FIG. 1 illustrates an exemplary prior art analog-to-DVI converter 101. This converter 101 takes an analog video input 105 (VGA or component) and converts that analog input into a Digital Visual Interface (DVI) output 107. Unfortunately, like all converters of this nature, converter 101 requires a direct external socket power source to supply the converter 101 with the power necessary to drive its conversion circuitry through port 103. For example, the converter 101 may use a transformer plugged into a wall socket to provide DC voltage to it or include a transformer inside of the converter's shell that is supplied an AC voltage from a wall socket.

FIG. 2 illustrates an exemplary prior art HDMI switch 201. This particular switch takes in two HDMI inputs 203, 205 and has one HDMI output 207 that is selected from one of the two inputs. Like the prior art converters, prior art HDMI switches require a direct external power source to provide power to a port 209 of the switch 201.

FIG. 3 illustrates an exemplary prior art A/V receiver 301. This receiver 301 takes in multiple traditional A/V sources 303_1 and 303_2, multiple HDMI sources 303_3 and 303_4, and outputs a single HDMI output 307. A/V receivers with HDMI pass-through also have their drawbacks. Like the prior art converters and switches, prior art A/V receivers require a direct external power source to provide power to a port 305. A/V receivers are also bulky and expensive when compared to a simple switch or converter. While A/V receivers also likely have features that are never used and not enough of the features (inputs) that a user wants, the user is saddled with the capabilities of the A/V receiver that is neither flexible or "future proof."

BRIEF DESCRIPTION OF THE DRAWINGS

The present invention is illustrated by way of example, and not limitation, in the figures of the accompanying drawings in which like references indicate similar elements and in which.

SUMMARY

A system, method, and apparatus for inline audio/visual conversion are described. Power to an inline converter is provided over the A/V cable that couples the converter to a destination such as a selector.

DETAILED DESCRIPTION

As described earlier, the prior art approaches to HDMI switch and analog to HDMI conversion all have their drawbacks and failings. For example, HDMI switches do not provide the flexibility to use any type of connection that a user has and HDMI converters require external power to convert analog signals or switch sources. An improved approach allows users to connect a number of older and newer format devices to a single device with a selectable output to the digital display. The approach should be flexible enough to support today's different input combinations and easily upgrade older devices or add new devices in the future.

Modular Conversion

Figure 1:
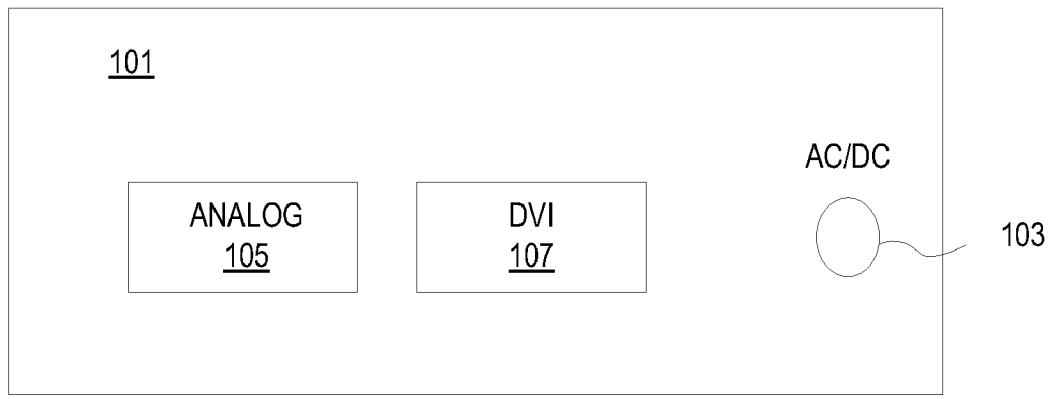
FIG. 1 illustrates an exemplary prior art analog to DVI converter.
Figure 2:
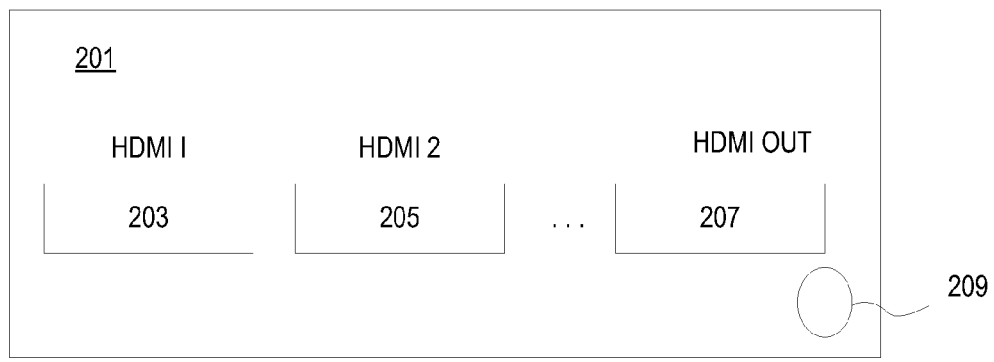
FIG. 2 illustrates an exemplary prior art HDMI switch.
Figure 3:
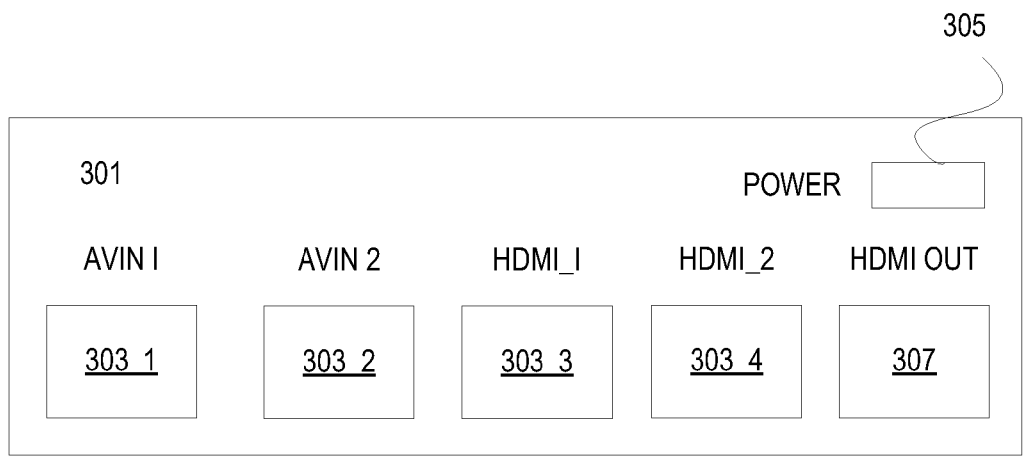
FIG. 3 illustrates an exemplary prior art A/V receiver.
Figure 4:
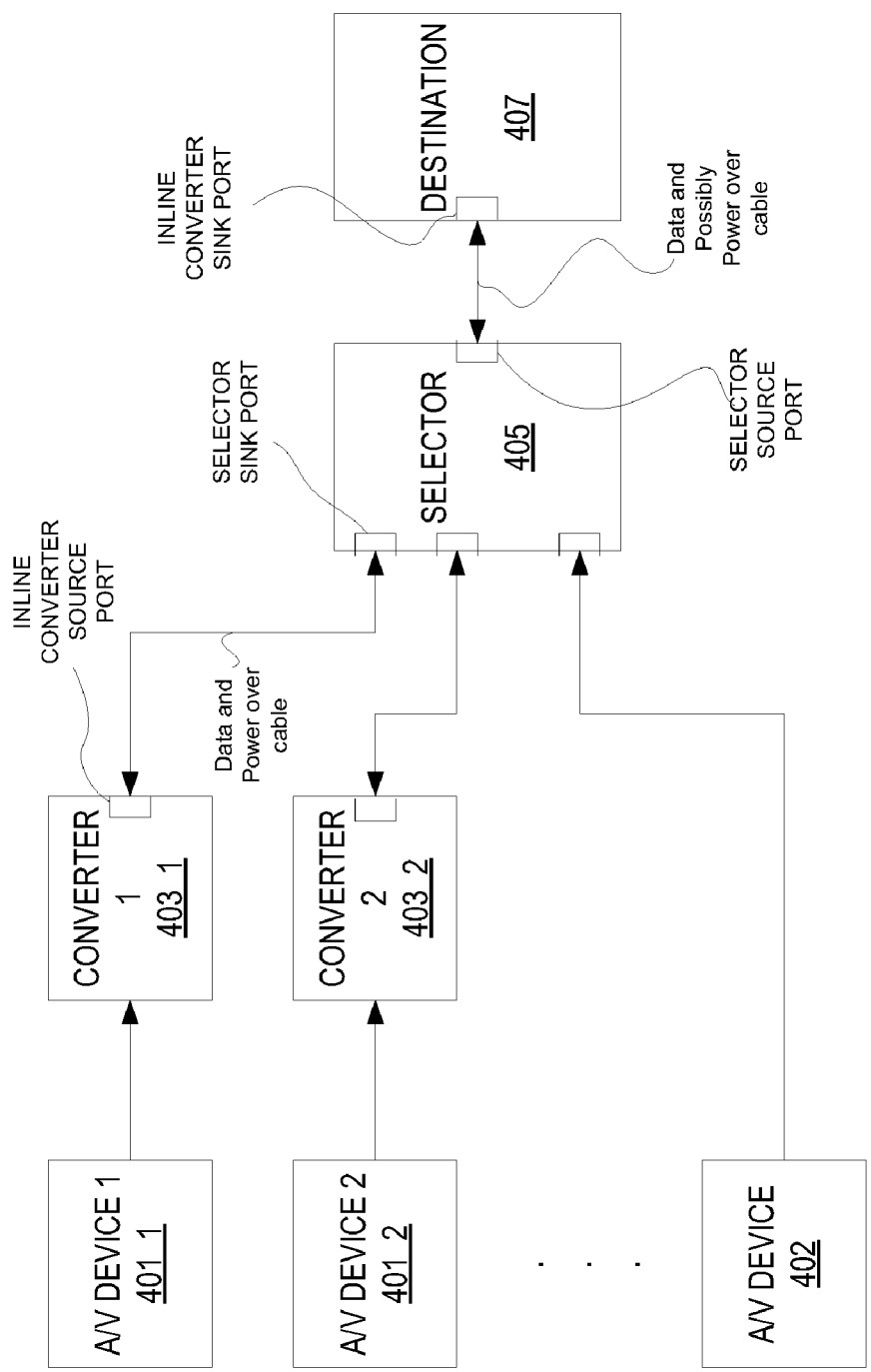
FIG. 4 illustrates an example of using a selector and one or more converters to provide a single digital A/V stream from multiple input signals to a destination.

FIG. 4 illustrates an example of using a selector and one or more converters to provide a single digital A/V stream from multiple input signals to a destination. In this example, there is a need to connect several different A/V devices 401, 402 to a single destination 407. These A/V source devices 401 may output any combination of analog video signals (such as composite, component, S-video, etc.), analog audio signals (left and right channel audio), digital video signals (such as DVI), and/or digital audio (optical or digital).

While one of these devices 402 is in the format that the selector 405 accepts, two of these devices require an inline source converter 403 to convert their outputs (analog or digital) into a digital format that is acceptable to the selector. For example, these outputs may be converted into a single digital A/V stream instead of the multiple signals that are typically associated with these devices. In an embodiment, these analog or digital outputs are converted into the HDMI format which is a single digital A/V stream.

An N×M HDMI selector 405 receives up to N A/V outputs from these A/V devices 401, 402 and outputs M single digital A/V streams (N and M may be any number 1 or greater). The use of the inline converters 403 in junction with the selector 405 allows for a more flexible approach than the traditional receiver or switch provides as all that is needed to connect a new device that cannot be accepted by the selector 405 is the appropriate converter cable 403. Because of this, a user is not tied to some set of pre-chosen selector inputs that may not fulfill his/her needs. The destination 407 may be anything that accepts single digital A/V stream as a source including a digital display such as an HDTV, DLP project, etc. or a conversion cable.

In an effort to help make the following description easier to follow some terms are herein defined. The output from an inline converter cable comes from an "inline converter source port." This output is so named because it will be the source to an input of the selector 405. The selector 405 has N inputs that are called "selector sink ports" which receive data from the output the inline converter cables. The selector 405 also has M outputs called "selector source ports" which provide an input for destination 407. Finally, destination 407 has an inline converter sink port that receives a single digital A/V stream from the selector's 405 selector source port. For example, converter 1 403_1 may output an HDMI signal from its inline converter source port which is coupled to a selector sink port of selector 405 and selector 405 may output an HDMI signal from one of its selector source port's to an inline converter sink port of destination 407.

Conversion Circuitry

Traditionally, single digital A/V stream cables, such as HDMI cables, have been used almost exclusively for transmitting A/V data and not receiving data or power (one exception being that pin 19 of a Type A HDMI connection is used for "hot plug" detection). For this reason, all of the prior art approaches to analog-to-DVI or HDMI conversion required a power source external to the conversion circuitry to power the conversion circuitry. This extra power source is often a cumbersome apparatus and limits the flexibility where these converters are usable.

Figure 5:
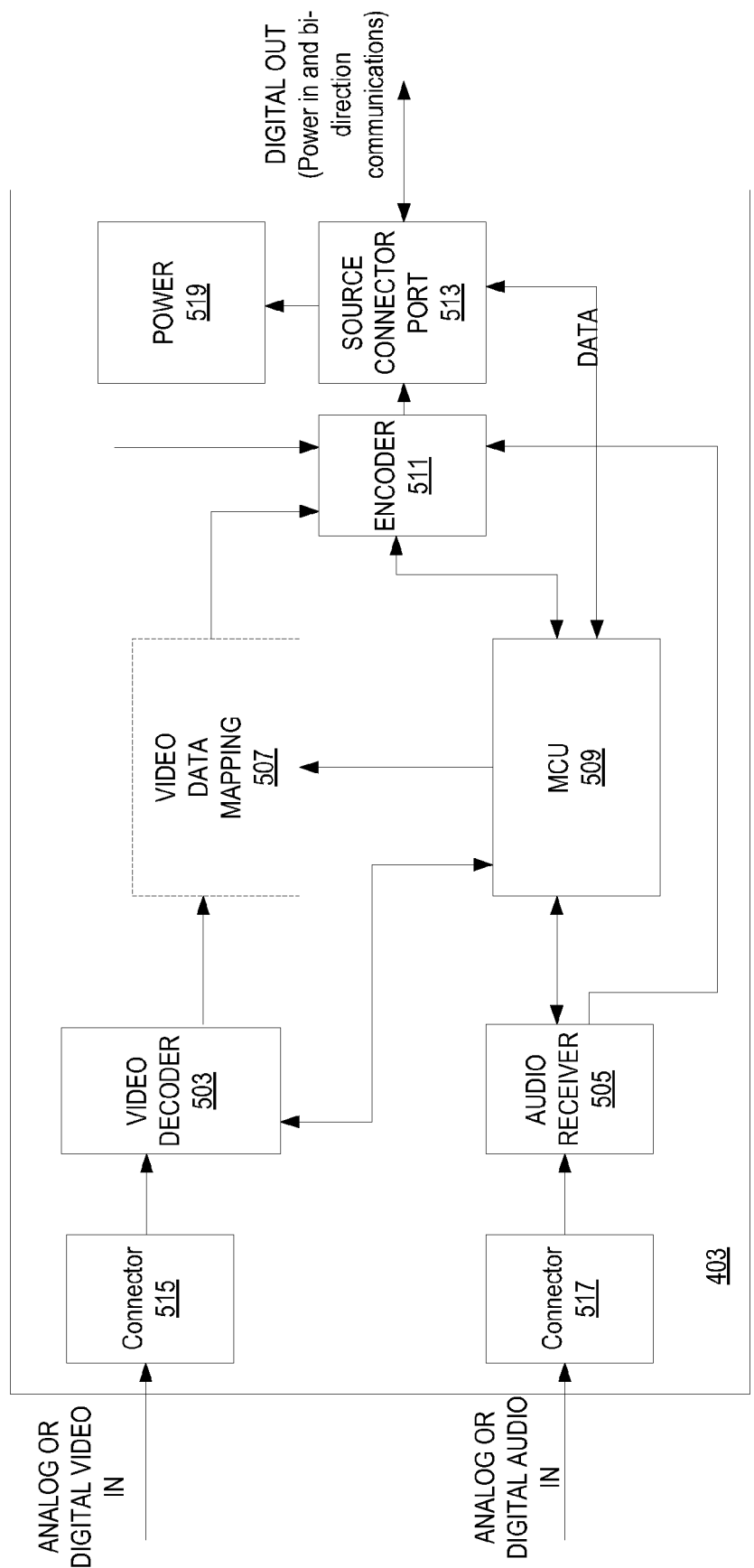
FIG. 5 illustrates an embodiment of circuitry of an inline source converter.

FIG. 5 illustrates an embodiment of circuitry of an inline source converter. This converter 403 converts one or more analog and/or digital video and/or audio source signals into a single digital A/V stream such as HDMI. An input video connector 515 receives one or more video signals. These signals are passed to a video decoder circuit 503 to convert analog or digital video of different formats (SDTV, HDTV, NTCS, PAL, etc) and standards (RGB, SCART, Composite, Component, S-Video, DVI, SDI, etc.) into digital signals of different color space (RGB, YCrCb, etc). Outputs from the video decoder 503 include a group of digital signals composed of 24 to 36 digital signals to support different color resolutions (8, 10 or 12 bits per color, either 4:2:2 or 4:4:4) and color spaces (RGB or YCrCb). The video decoder 503 may support several different analog and/or digital video standards or be specific to just one video standard. For example, the video decoder 503 may support one or more of the following analog video standards: Composite (CVBS), Component (Pb, Pr, and Y), S-Video (Y and C), and RGB (R, G, B, Hs, & Vs); and digital video standards such as DVI. The converted digital video signals are transmitted to either the optional video data mapping circuit 507 or to the encoder 511 depending upon the configuration of the inline converter.

This circuit 503 also extracts timing information, embedded in the video stream, into dedicated output signals which are transmitted to the coupled encoder circuit 511. Exemplary timing information includes, but is not limited to, horizontal and vertical syncs, data enable (turn on) information, and pixel clock information. Exemplary circuits that may be used for the video decoder circuit 503 include, but not limited to, Analog Devices' ADV7403 and Philips' SAV7118.

An audio connector 517 receives one or more analog or digital inputs depending upon which type of connector (analog or digital) is used. These inputs are passed at audio receiver 505. If an analog audio input is received, the audio receiver 505 converts source analog audio signals into a serial digital stream including serial audio data, clock, and left/right channel select. For example, the audio receiver 505 may convert left and right audio channels into Inter-IC Sound (I2S) signals of different sampling rates. This digital stream is transmitted to the encoder circuit 511. Exemplary circuits that may be utilized as the audio ADC 505 include, but are not limited to, Asahi Kasei's AK5357.

If the audio stream is digital, then this circuit 505 may be an optical or non-optical receiver to support digital audio in the form of AES-EBU or Sony/Philips Digital Interface Format (SPDIF). Exemplary circuits that may be utilized as the receiver 505 include, but are not limited to, Toshiba's TORX141.

The encoder circuit 511 is a specialized device that receives video data output from the video decoder circuit 503 (and optional video data mapping circuit 507) and audio data from audio receiver 505 and converts them from separate (parallel) streams into an encoded single digital serial A/V stream using timing signals from the video decoder circuit 503.

In an embodiment, the single digital serial A/V stream is an HDMI stream and the encoder circuit 511 outputs two signal buses to the connector 513. The first signal bus is the "TMDS" bus which is a group of four pairs of signals containing the high-speed serial data. The second signal bus is the "DDC" bus which is a group of two signals used to support configuration and content protection.

Exemplary circuits that may be utilized as the encoder circuit 511 are Silicon Image's Sil9134 & Sil9030, and Analog Devices' AD9889.

The microcontroller or processor (MCU) 509 is a general purpose controller that performs one or more of the following functions: configures the other circuits; maintains validation of communications over a reserved pin or pins of the cable carrying the single digital A/V stream from the converter; software upgrades; monitor conversion activities being performed; inspect signals; serially communicates with a connected device, etc. The MCU 509 provides and receives numerous control signals to the other circuits. For example, the MCU 509 receives interrupts from the video decoder 503, audio receiver 505, and encoder 511.

The MCU 509 provides the video decoder 503 with control signals that are in the form of a low-rate serial interface, such as I2C (Inter-Integrated Circuit) or SPI (Serial Peripheral Interface). Other control signals provided to the video decoder 503 include signals for reset, interrupts, and select(s). Control signals to the audio receiver 505 from the MCU 509 range from discrete signals to a serial bus in the form of I2C or SPI and may include reset, interrupts, and select signals. Exemplary circuits that may be utilized as the MCU 509 include, but not limited to, are Atmel's AT91SAM7S, Microchip's PIC18F8722, and OKI's ML67Q4061.

A source connector port 513 provides an interface for communicating with another device such as a selector. The single digital A/V stream generated by the encoder circuit 511 is transmitted through this connector port 513 over a single cable to another device such as a selector.

The conversion circuitry also includes power circuitry 519. The power circuitry receives power (current and voltage) through the single digital A/V cable from an external device such as a selector and supplies power to the other conversion circuits 503, 505, 507, 509, and 511. Of course not every circuit has the same power requirements so voltage dividers, etc. may need to be utilized to provide each circuit with the proper power requirement. No prior art conversion system has its conversion circuitry powered in this manner—each requires a direct connection to an external power source. For example, if the conversion circuitry is creating and outputting an HDMI stream, pin 18 of a Type A HDMI connector carries power (+5V and approximately 50 mA or 500 mA current) that is used to power circuitry 519 of the inline converter through a coupled HDMI cable from an external device. In other words, the external device provides power to the converter over the cable and eliminates the need for the converter to have a direct external power source. Additionally, pin 14 of the HDMI connector (which is normally reserved) is used to communicate information from the MCU 509 to an outside device over the HDMI cable.

In an embodiment, the conversion circuitry includes a video data mapping circuit 507 that is an active switch that arranges the bit ordering from the digital bus output of the video decoder 503 into the proper format for the encoder circuit 511. This ordering is performed to satisfy specific requirements of different video formats and resolutions. The re-ordering may only apply to a group of bits or the entire bus of bits transmitted from the video decoder 503 to the video data mapping circuit 507. Any active analog switch, such as the On Semi MC14016 or equivalent, is suitable for the application. The control signals provided to the video data mapping circuit 507 depend on the specific implementation of the analog switch and could range from discrete signals to a serial bus in the form of I2C or SPI.

In some embodiments, inputs to the conversion circuitry are dedicated A/V cables that are hardwired through the housing and not simply ports/connectors. In other embodiments, only the cables or ports for a particular input are present. Similarly, the output may be a hardwired cable (such as an HDMI cable or variant).

Selector

Figure 6:
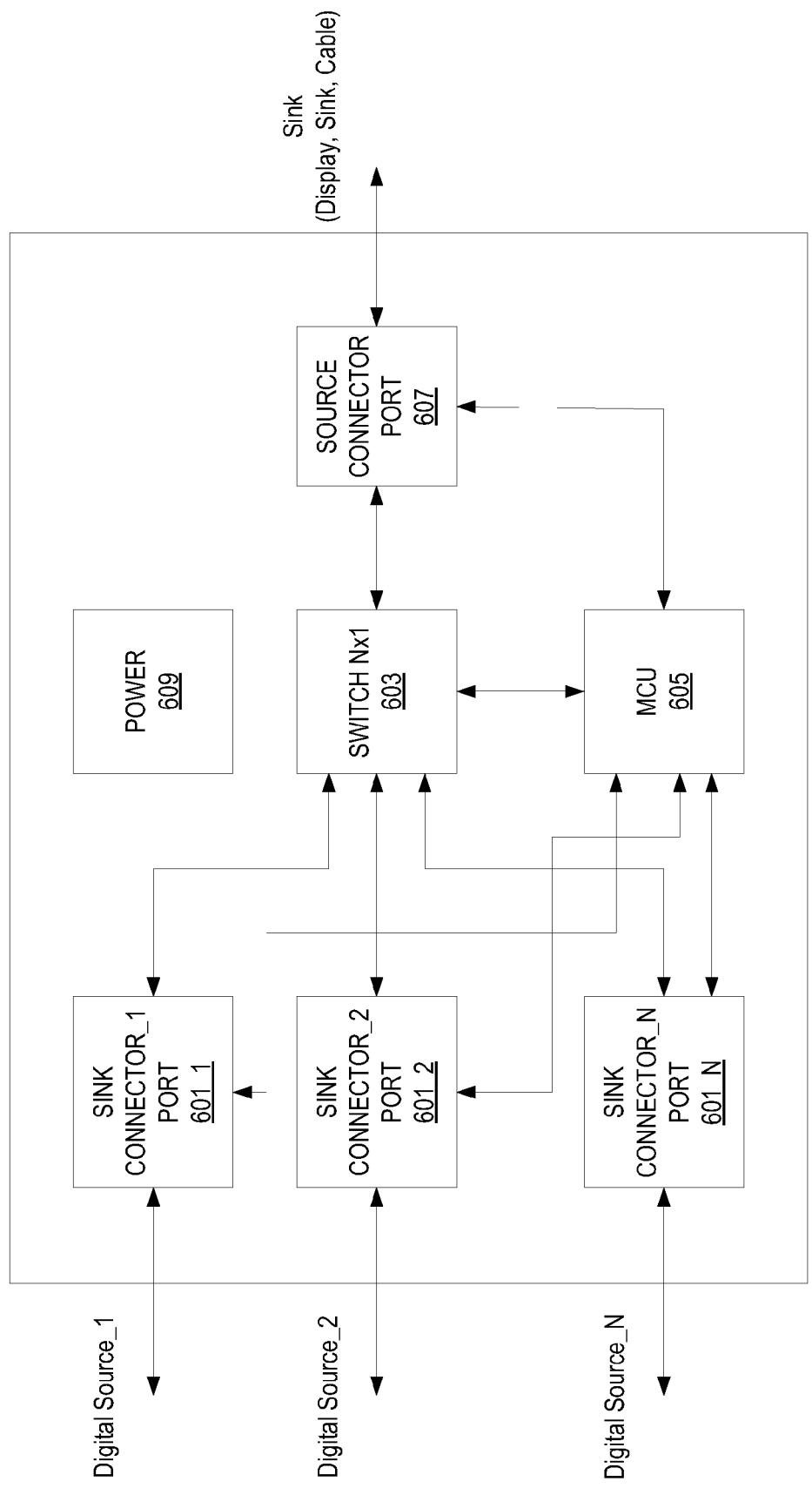
FIG. 6 illustrates an embodiment of a selector that provides power to a converter.

FIG. 6 illustrates an embodiment of a selector that provides power to a converter. The selector includes N sink connectors 601_1 to 601_N. Only one cable may connect to a sink connector 601 at a time. Through the existing power pin or pins of a sink connector 601 power (current and voltage) may be supplied to a source device such as converter 403. Additionally, communications between the source device (converter 403) and selector may be transmitted through one or more reserved pins of the sink connector 601.

In an embodiment, the selector is an HDMI selector and accepts multiple HDMI inputs and outputs HDMI streams. If the standard 19-pin Type A HDMI connector is used, pin 18 of each HDMI sink connector 601 is used to sense if a "normal" HDMI cable is connected to the selector through the source connector 601 or if the cable that is attached is coupled to a device that requires power. If the voltage on pin 18 is +5V, then it is assumed that a normal HDMI cable is connected and no power needs to be supplied. If the cable is coupled to a device that requires power such as the converter described earlier then no voltage will be on pin 18. Pin 14 of the HDMI connector (which is normally reserved) is used to communicate information between the MCU 509 of the converter and the MCU 605 of the selector.

A N×M switch 603 is used to switch between the N sources so that M outputs are selected at a time. Typically, M is equal to 1 and N is greater than 1. An output of the switch 603 is supplied to a source connector port 607.

In an embodiment, the source connector port 607 is a standard HDMI connector. Pins 18 and 14 of the HDMI source connector port 607 are used in similar manner as pins 18 and 14 of the HDMI sink connectors 601. The output of the source connector port 607 may be sent to a digital display, other selector, or to a digital converter. If the N×M switch 603 is an HDMI switch, then exemplary circuits that may be utilized as the switch 603 include, but not limited to, TI's TMDS341 and Pericom's PI3HDMI341ART.

The MCU 605 is a general purpose controller that performs one or more of the following functions: configures the other circuits; maintains communications over attached cables with an inline converter that requires power from the selector; and software upgrades. The MCU 605 provides and receives numerous control signals to the other circuits. The MCU 605 provides the N×1 HDMI switch 603 with a signal to select which of the N inputs to output and a transmit enable (turn on) signal.

Additionally, one or more of the power circuits 609 provide a voltage and a current to one or more inline converters that require power (connections not shown). In one embodiment, the MCU 605 only provides this voltage and current to sink connectors 601 or source connectors 607 that have a converter coupled to them through a cable.

In an HDMI specific embodiment, a +5V reference and high- or low-current are supplied to pin 18 of HDMI sink connector ports 601 and/or source connector port 607. The circuitry of the HDMI selector may be power by an external power source.

Figure 7:
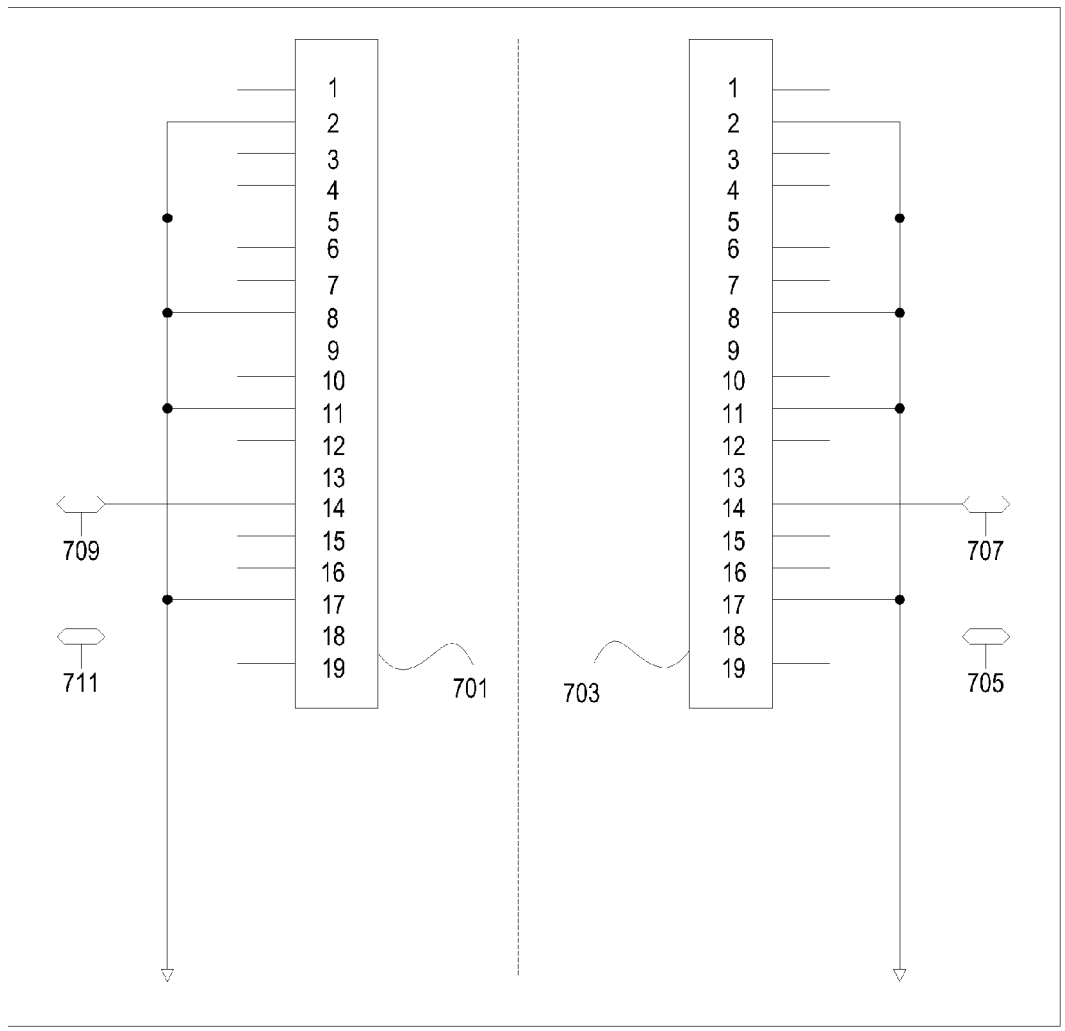
FIG. 7 illustrates an embodiment of two HDMI connectors used as a sink and a source connector.

FIG. 7 illustrates an embodiment of two HDMI connectors used as a sink and a source connector. Both connectors have the Type A standard 19 pins. Pin 18 711, 705 is used to transfer high-current and low-current +5V references from the selector to a converter. Pin 14 709, 707 is used to transmit messages between the selector and converter.

Power from Selector to Source Converter

Figure 8:
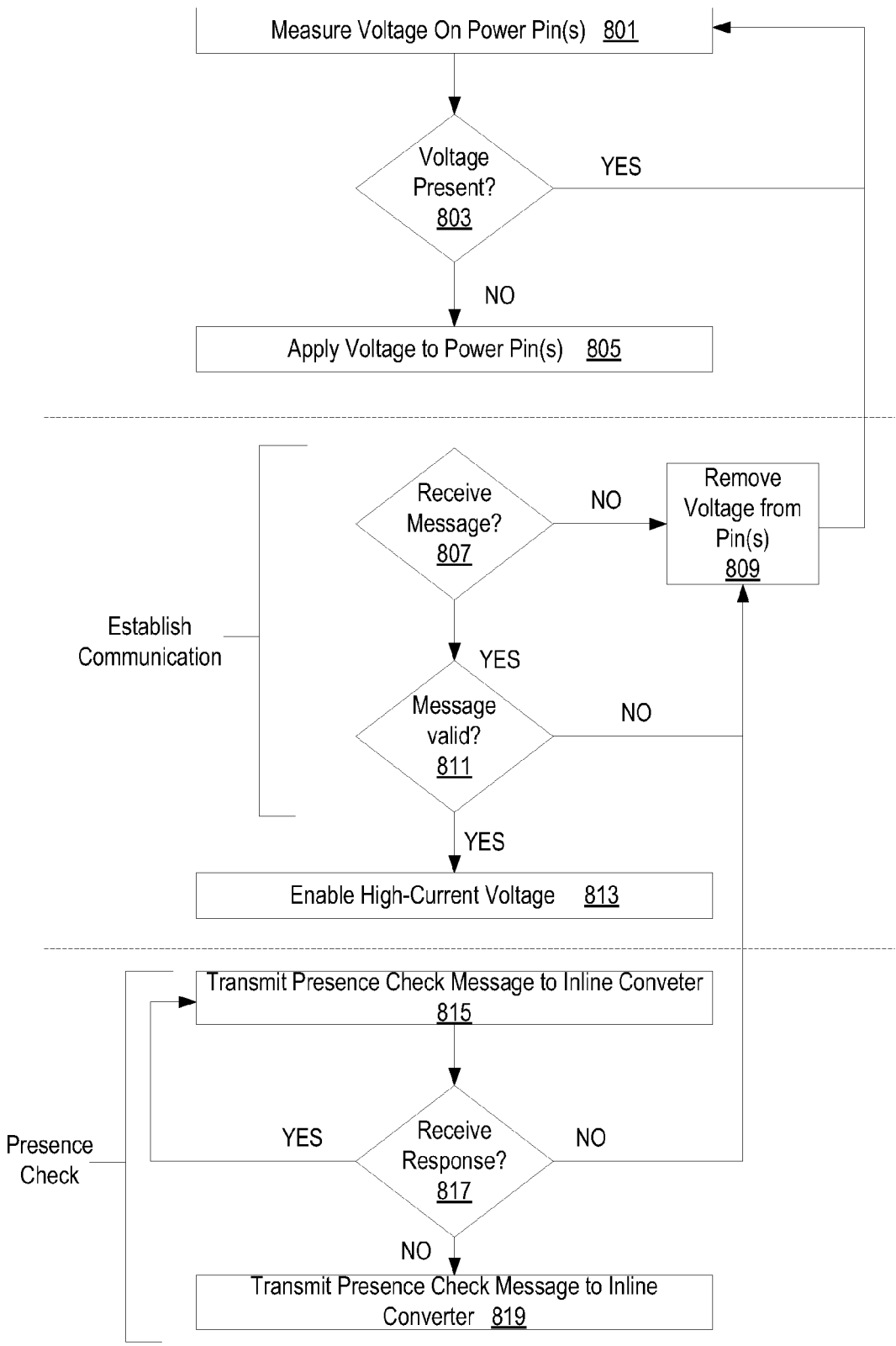
FIG. 8 is an embodiment of a method of providing and maintaining power from a selector to source converter over a cable.

One or more of the circuits of the source conversion circuitry is provided power (current and voltage) through the cable that is connected to the selector. FIG. 8 is an embodiment of a method of providing and maintaining power from a selector to source converter over a cable.

The selector 405 measures the voltage found on one or more of the sink connector power pins 601 at 801. For example, if using HDMI, the MCU 605 of the selector 405 measures the voltage on pin 18 of one or more of the sink connector ports 601.

If there is a voltage present, then it is assumed that the coupled device does not need power. For example, if a standard HDMI source device is connected to the port it would not require power. The port is identified as having a device that does not require power at 803.

If there is not a voltage present, a low-current reference voltage is provided on one or more of the power pins by the power circuit 609 selector 405 at 805. Typically, this low-current voltage is provided on the behest of the MCU 605. This low-current reference voltage will be carried by the cable coupling the selector 405 and converter 403. For example, if using HDMI, a low-current +5V reference will be applied to pin 18 of the sink connector port 601 and carried to pin 18 of the converter 403. According to an embodiment, the current is on the order of 50 mA.

Once a low-current voltage has been provided to the converter 403, a communications link should be established between the selector 405 and converter 403. This communication may be used to determine if the converter 403 needs more current and if it is still alive. In an embodiment, the low-current voltage allows for at least a part of the MCU 509 of the converter 403 to be turned on and generate one or more messages. In an embodiment, the converter 403 transmits a "presence" message over a reserved or unused pin of its connector port 513.

If a message has not been received at 807, then the low-current reference voltage is removed from the power pin(s) at 809. This removal serves two purposes. First, it saves power by not unnecessarily providing power to a device (or no device) that does not need or want the power. Second, it will not provide a false positive if or when the selector measures the voltage on the pin(s) at some later point in time.

If a message is received at 807, the selector determines if the received message is a valid presence message at 811. For example, MCU 605 executes a software routine to determine if the message received is valid. If HDMI is being utilized, all messages are received or transmitted on pin 14 of the respective HDMI connectors.

If the message is not valid, the low-current reference voltage is removed from the power pin of the appropriate connectors 601. For example, the MCU 605 orders the power circuit 609 to stop providing the low-current reference to the appropriate sink connector 601.

If the message is valid, then appropriate power pin(s) is supplied with a high-current reference voltage. For example, if HDMI is being used, a high-current of around 500 mA is supplied with a +5V reference. This high-current reference allows the rest conversion circuitry of the converter 403 to be activated.

Of course it should be understood that it is not overly important which device initiates the establishment of a communications between the devices. In an alternative embodiment, the selector 405 pings the converter with a presence message after it has provided low-current power to the converter 403.

Because the converter 403 may be removed or stop functioning at a later point in time, periodic presence checks are performed. The selector 405 transmits a presence check message to the converter 403 at 815 and waits for a response message. If the selector 405 does not receive a response message at 817, one of two actions may be taken depending upon the configuration of the selector 405. Another presence check message may be transmitted at 819 or the voltage for the power pin may be removed. For example, if only one presence message was sent, it may be that the converter is too busy to respond and should be given another chance to respond as removing the high-current voltage reference would shut off the conversion circuitry thereby causing an interruption in the single digital A/V stream. Of course, it should be again understood that the converter 403 could also initiate the presence check.

Figure 9:
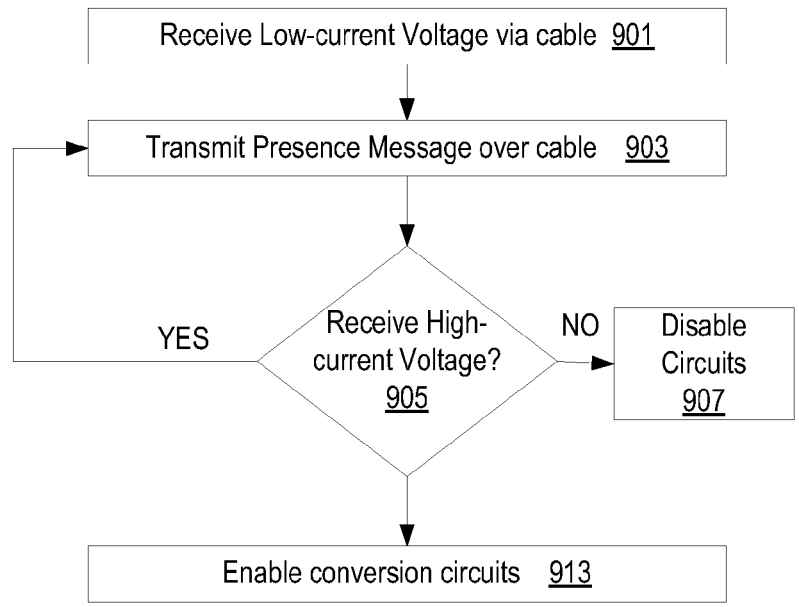
FIG. 9 is an embodiment of a method of a converter receiving and maintaining power from a selector.
Figure 9:
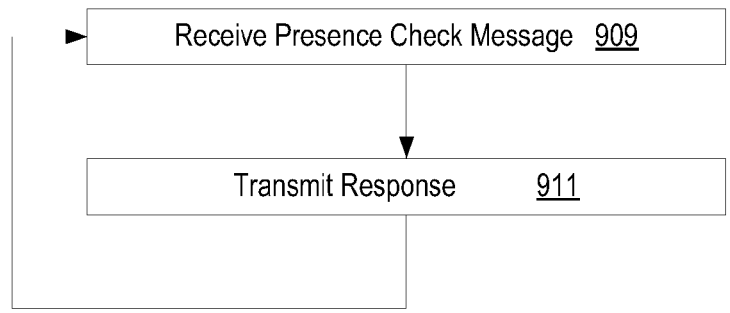

FIG. 9 is an embodiment of a method of a converter receiving and maintaining power from a selector. The converter 403 receives a low-current reference voltage over a cable from the selector 405 at 901. For example, a +5V reference voltage is applied to pin 18 if HDMI is used.

The converter 403 transmits a presence message over one or more reserved or unused pins to the selector at 903. This is done over pin 14 if a Type A HDMI connector is used. For example, once the MCU 509 is turned on the by the low-current reference voltage, it prepares and transmits a presence message through pin 14 of the connector 513.

If the converter 403 receives a high-current reference voltage at 905 it may transmit an acknowledgment message (depending upon the communication configuration). The converter 403 enable (turn on) the remaining conversion circuits using the high-current reference voltage at 913. If the converter 403 does not receive a high-current reference voltage at 905, one or more of its conversion circuits will remain disabled at 907.

Periodically, the selector 405 may check to see if the converter 403 is still alive and will transmit a presence check message to the converter 403. If the converter 403 receives the presence check message at 909 it will transmit a response message at 911 and awaits the next presence check message. Of course, it should be understood that the converter 403 could also initiate the presence check and receive a response from the selector 405.

Power from Selector to Destination Converter

Figure 10:
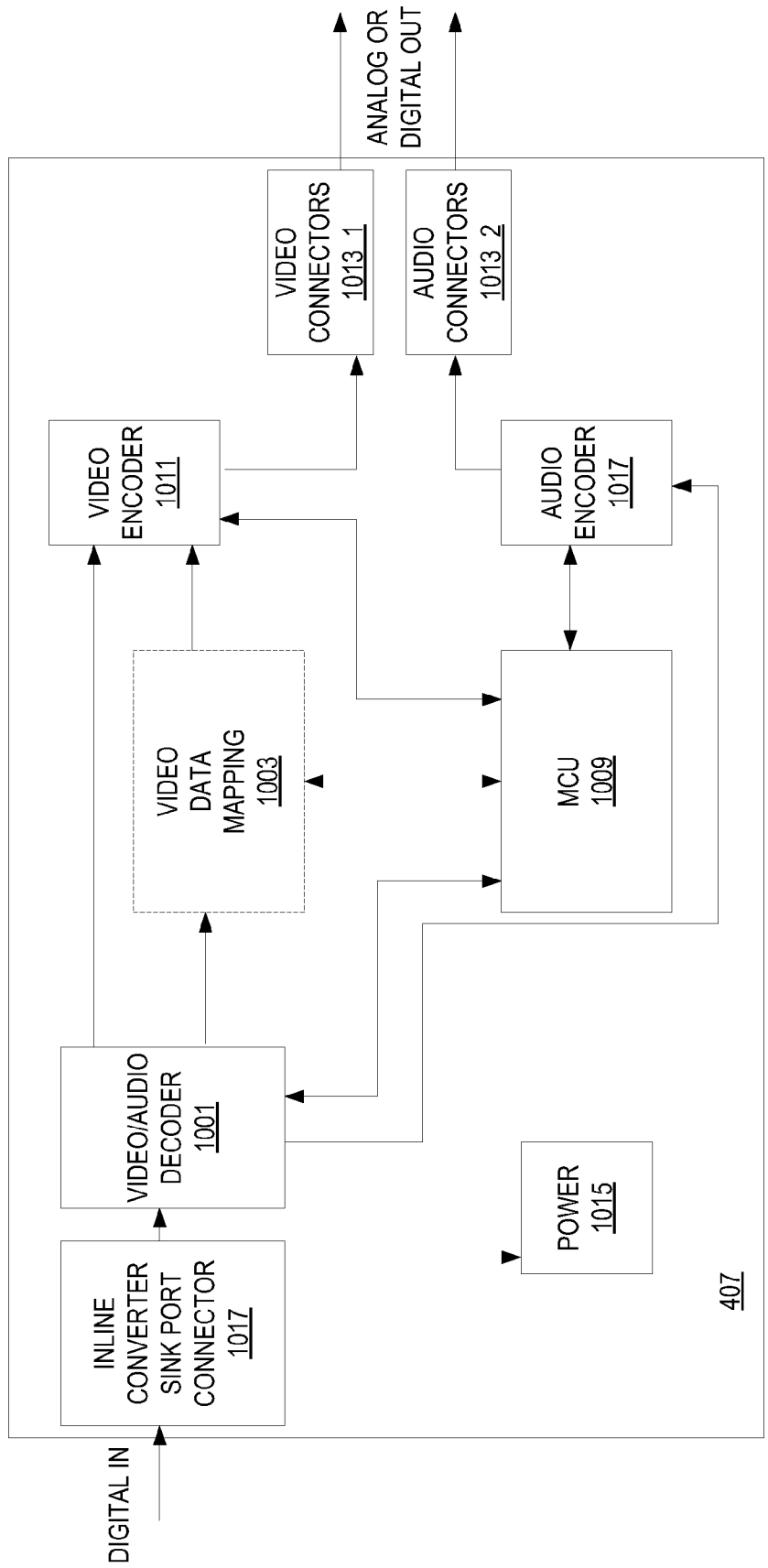
FIG. 10 illustrates an embodiment of a digital A/V stream converter.

FIG. 10 illustrates an embodiment of a digital A/V stream converter. As described with respect to FIG. 4, a digital A/V stream converter 407 may be the destination of a selector 405 instead of a display. The circuitry of this converter 407 receives a single digital A/V stream (such as an HDMI stream) and converts it into separate analog video and audio streams, separate analog video and digital audio, separate digital video and analog audio, or separate digital video and audio.

An inline sink port connector 1017 receives a single digital A/V stream from a selector 405. At any one point in time this stream may include power, communications, and/or A/V data (it should always at least have low-current power). The inline sink port connector 1017 passes the power to the power circuit 1015 which distributes it to the other components of the digital A/V stream converter. According to an embodiment, only the MCU 1009 receives power when the low-current power is received.

Decoder circuitry 1001 receives the single digital A/V from the connector 1017 and outputs a digital data bus which represents video data of different formats (SDTV, HDTV, NTCS, PAL, etc) and color space (RGB, YCrCb, etc) and audio digital serial data is in the form I2S or SPDIF. The decoder 1001 also extracts embedded timing information into output signals. In an embodiment, the input stream into this block is the HDMI data bus in the form of a TMDS bus. The converted digital video signals are transmitted to either the optional video data mapping circuit 1003 or to the encoder 1011 depending upon the configuration of the inline converter. The audio signals are transmitted to audio encoder

1017. Control signals to the video decoder 1001, from the MCU 1009 are in the form I2C or SPI and may include reset, interrupts, and select(s). An exemplary circuit that may be utilized as the decode 1001 includes Silicon Graphics' Sil9031.

In an embodiment, the conversion circuitry includes a video data mapping circuit 1003 that is an active switch that arranges the bit ordering from the digital bus output of the video decoder 1001 into the proper format for the encoder circuits 1011. This ordering is performed to satisfy specific requirements of different video formats and resolutions. The re-ordering may only apply to a group of bits or the entire bus of bits transmitted from the video decoder 503 to the video data mapping circuit 1003. Any active analog switch, such as the On Semi MC14016 or equivalent, is suitable for the application. The control signals provided to the video data mapping circuit 1003 depend on the specific implementation of the analog switch and could range from discrete signals to a serial bus in the form of I2C or SPI.

Video encoder circuitry 1011 is a specialized device that converts the video digital data into analog data of various standards (RGB, SCART, Composite, Component, S-Video, etc). exemplary circuit that may be utilized as the video encoder 1011, but not limited to, are: Analog Devices AD7321, or equivalent. Input data into video encoder 1011 is a digital data bus from decoder 1001 and optional video data mapping 1003. Output data from encoder 1011 includes a number of dedicated analog outputs to support the various analog standards outlined above or digital output(s). Control signals to the encoder 1001, from the MCU 1009, are in the form I2C or SPI and may include reset, interrupts, and select(s). The video connector(s) 1013_1 serve as a port or ports for the video output and may be specific to a particular type of output.

The microcontroller or processor (MCU) 1009 is a general purpose controller that performs one or more of the following functions: configures the other circuits; maintains validation of communications over a reserved pin or pins of the cable carrying the single digital A/V stream from the selector; software upgrades; monitor conversion activities being performed; inspect signals; serially communicates with a connected device, etc. The MCU 1009 provides and receives numerous control signals to the other circuits. For example, the MCU 1009 receives interrupts from the audio/video decoder 1001. Exemplary circuits that may be utilized as the MCU 1009 include, but not limited to, are Atmel's AT91SAM7S, Microchip's PIC18F8722, and OKI's ML67Q4061.

The audio encoder circuitry 1017 converts the digital serial data from decoder 1001 to another format. Input data from video encoder 1001 is in the form of I2S which includes serial data, clock, and left/right channel select. If the output is to be analog, it coverts this data into analog left and right channels. Exemplary circuits to perform this include, but not limited to, Asahi Kasei' AK4386. If the output is to be digital, the audio encoder 1017 may be an optical TOSLINK (or similar) transmitter that converts digital SPIDIF into an optical link. The audio connector(s) 1013_2 serve as a port or ports for the audio output and may be specific to a particular type of output.

Figure 11:
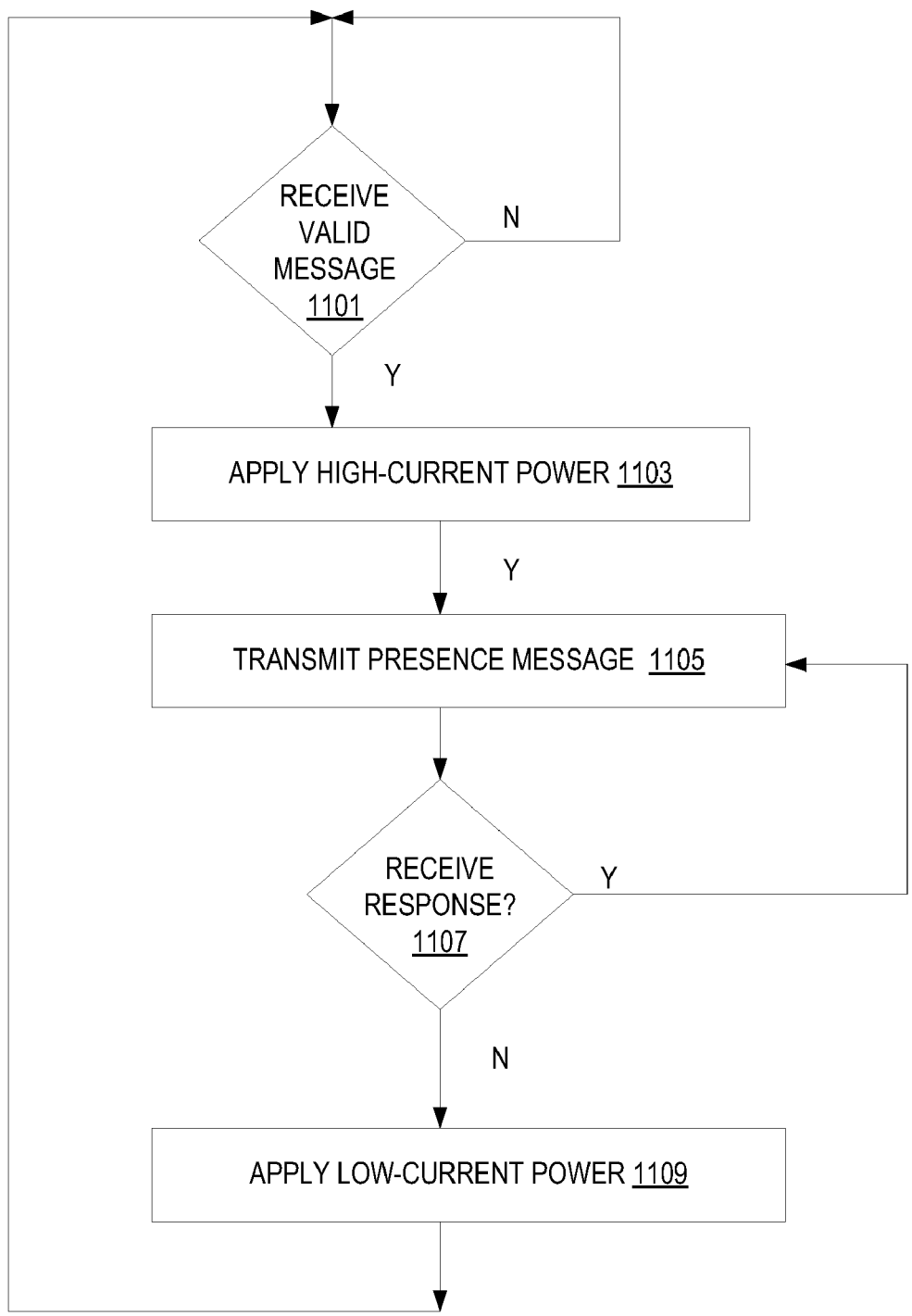
FIG. 11 is an embodiment of a method of providing and maintaining power from a selector to a digital A/V stream converter.

FIG. 11 is an embodiment of a method of providing and maintaining power from a selector to a digital A/V stream converter. Devices that are coupled to the selector's 405 source connector port 607 are initially supplied with a low-current reference voltage. For example, if HDMI is used an approximately 50 mA and +5V reference is provided on the HDMI cable from the selector 405 to the digital A/V converter 407. This is the standard current and voltage applied to that in by an HDMI source port.

Communication with the digital A/V stream converter 407 and the selector 405 should be established after the digital A/V stream converter 407 has received this low-current reference. In an embodiment, the digital A/V stream converter 407 transmits a presence message to the selector 405 (the MCU 1009 has been enabled and produces this message). If using Type A HDMI, this message is sent on HDMI pin 14.

If a message has not been received by the selector 405 at 1101, it simply continues to wait for a message. If a message is received at 1101, the selector 405 provides the appropriate power pins of the source connector 607 with a high-current reference voltage. According to an embodiment, the high-current is at least 500 mA and the voltage is +5V. This high-current reference voltage allows the remainder of the conversion circuitry of the digital A/V stream converter 407 to be activated.

Because the digital A/V stream converter 407 may be removed or stop functioning at a later point in time, periodic presence checks are performed. The selector 405 transmits a presence check message to the digital A/V stream converter 407 at 1105 and waits for a response message. If the selector 405 does not receive a response message at 1107, one of two actions may be taken depending upon the configuration of the selector 405. Another presence check message may be transmitted at 1105 or the high-current voltage may be removed and replaced with a low-current reference voltage at 1109. Of course it does not matter who initiates the presence check and who sends the corresponding response message.

Figure 12:
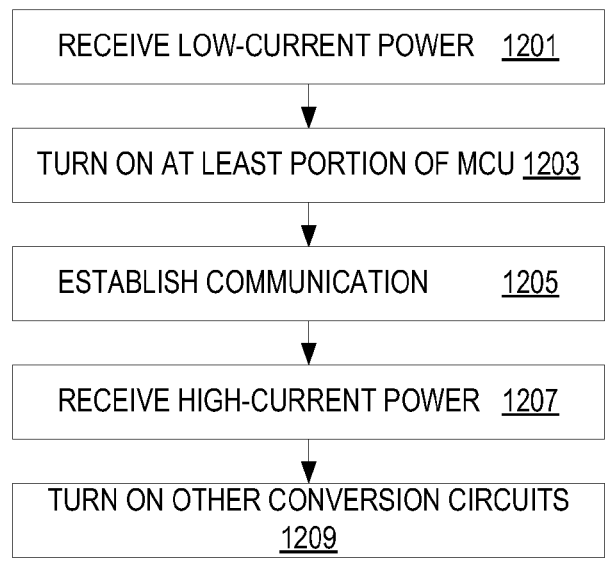
FIG. 12 is an embodiment of a method of a digital A/V stream converter receiving and maintaining power from a selector.
Figure 12:
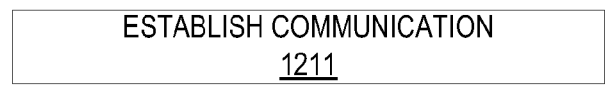

FIG. 12 is an embodiment of a method of a digital A/V stream converter receiving and maintaining power from a selector. The digital A/V stream converter 407 receives a low-current reference voltage over a power pin at power circuit 1019 at 1201. If HDMI is being utilized the current is approximately 50 mA and voltage +5V and power pin 18 would be used to receive the current and voltage.

This low-current voltage allows the digital A/V stream converter 407 to turn on at least a portion of its MCU 1009 at 1203 such that the digital A/V stream converter 407 may generate and/or respond to presence messages. Communication with the selector 405 is established at 1205. As described earlier, the digital A/V stream converter 407 may send a message and if found valid by the selector 405 then communication has been established. Or, the selector 405 may transmit a presence message and the digital A/V stream converter 407 may respond thereby establishing communication.

Once communication has been established, the digital A/V stream converter 407 enables the remainder of its conversion circuitry at 1209.

Periodically, the selector 405 and the digital A/V stream converter 407 should establish communication 1211 to ensure that the digital A/V stream converter 407 is still present and requires the higher-current. Numerous communications establishment techniques have already been described.

HDMI Connection to Switch

Figure 13:
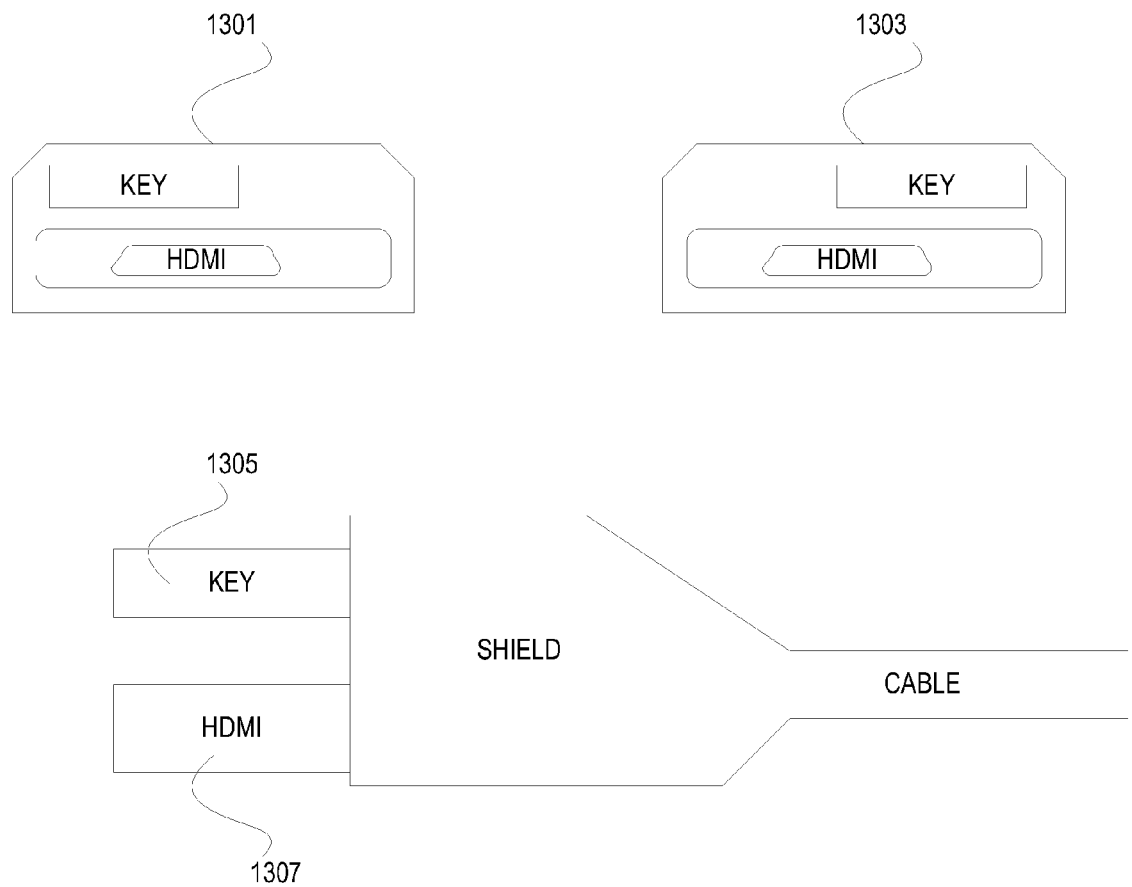
FIG. 13 illustrates an embodiment of an extended HDMI interface.

One of the disadvantages to traditional HDMI switching is that both connectors of a conventional HDMI cable are identical. FIG. 13 illustrates an embodiment of an extended HDMI interface. In addition to the normal HDMI end 1307, a key 1305 is embedded in the shield of the cable end. This key 1307 extends from the shield and can be in any orientation so long as the input and output ends of the HDMI cable have their respective keys in different orientations. Of course, while an HDMI cable is illustrated, any other cable/key combination may be used.

In an embodiment, the key is a clear or lightly colored material that allows light to pass through it. For example, an internal key may shine green or solid when connected while an external key may shine red or flash, thus allowing a user to easily distinguish between the two. This also solves the problem of a user not knowing if an issue (such as a poor or no display on a TV) is due to the components or the cable connecting the components. As illustrated, an input end 1303 has a different orientation for the key than the output end 1301, thus eliminating the possibility that output of a cable could be placed into an input port.

Figure 14:
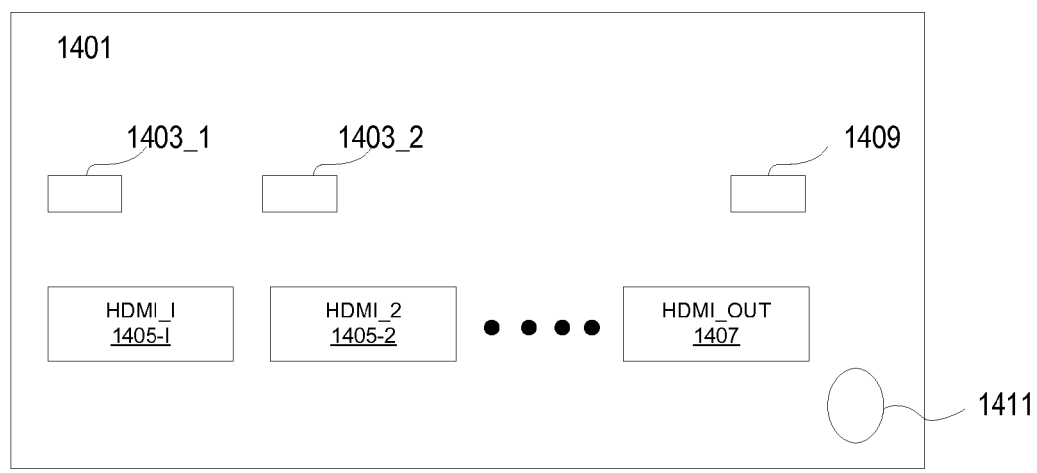
FIG. 14 illustrates an embodiment of the external connections of an HDMI switch that utilizes an extended HDMI interface.

FIG. 14 illustrates an embodiment of the external connections of an HDMI switch that utilizes an extended HDMI interface. The HDMI switch 1401 includes multiple HDMI inputs 1405 and one HDMI output 1407. Of course, any HDMI cable may be used with any of these inputs including the conversion cable described earlier. Of course, if the conversion cable is used, the HDMI switch 1401 should employ a power distribution mechanism such as was previously described.

Additionally, an input for a key per HDMI input 1403 or output 1409 is provided. This key input ensures that the proper cable end is used. In an embodiment, the HDMI switch 1401 includes LEDs (or some other sort of light source) to shine through the key when a connection has been established. Like the prior art HDMI switches, this switch 1401 requires external power through a port 1411.

In an embodiment, the insertion of a key into a key input of a selector is used to determine that a converter that needs high-current power from the selector is coupled to the selector. The insertion of a key may trigger as a switch or hall-effect sensor inside the selector that validates such a converter is present. This technique may be is in conjunction with or instead of the communication schemes described earlier.

Closing Comments

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's NET, Mono, Java, Oracle Corporation's Fusion etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.).

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 15:
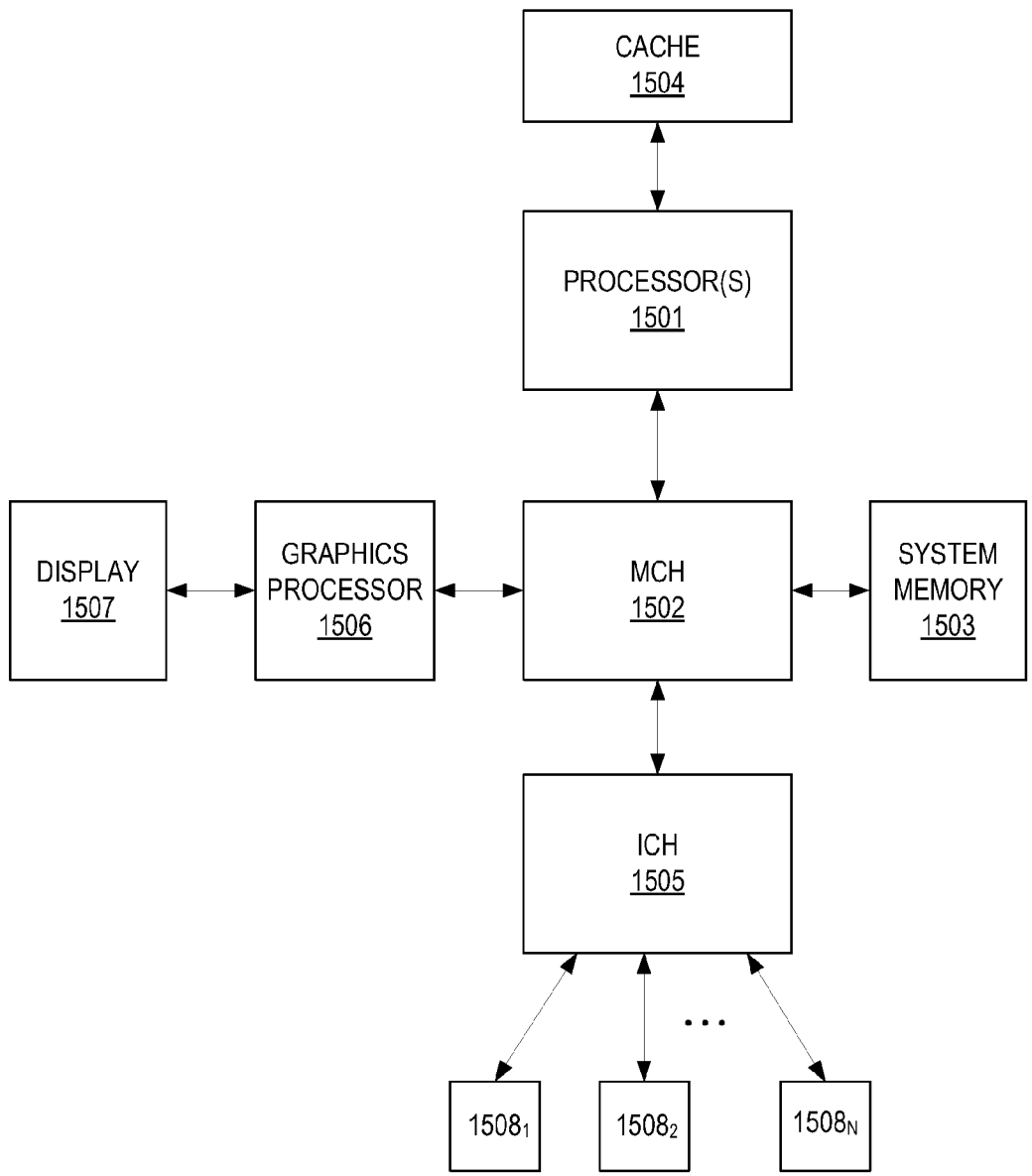
FIG. 15 shows an embodiment of a computing system.

FIG. 15 shows an embodiment of a computing system (e.g., a computer). The exemplary computing system of FIG. 15 includes: 1) one or more processors 1501; 2) a memory control hub (MCH) 1502; 3) a system memory 1503 (of which different types exist such as DDR RAM, EDO RAM, etc,); 4) a cache 1504; 5) an I/O control hub (ICH) 1505; 6) a graphics processor 1506; 7) a display/screen 1507 (of which different types exist such as Cathode Ray Tube (CRT), Thin Film Transistor (TFT), Liquid Crystal Display (LCD), DPL, etc.; 15) one or more I/O devices 1508.

The one or more processors 1501 execute instructions in order to perform whatever software routines the computing system implements. The instructions frequently involve some sort of operation performed upon data. Both data and instructions are stored in system memory 1503 and cache 1504. Cache 1504 is typically designed to have shorter latency times than system memory 1503. For example, cache 1504 might be integrated onto the same silicon chip(s) as the processor(s) and/or constructed with faster SRAM cells whilst system memory 1503 might be constructed with slower DRAM cells. By tending to store more frequently used instructions and data in the cache 1504 as opposed to the system memory 1503, the overall performance efficiency of the computing system improves.

System memory 1503 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 1503 prior to their being operated upon by the one or more processor(s) 1501 in the implementation of a software program. Similarly, data that a software program determines should be sent from the computing system to an outside entity through one of the computing system interfaces, or stored into an internal storage element, is often temporarily queued in system memory 1503 prior to its being transmitted or stored.

The ICH 1505 is responsible for ensuring that such data is properly passed between the system memory 1503 and its appropriate corresponding computing system interface (and internal storage device if the computing system is so designed). The MCH 1502 is responsible for managing the various contending requests for system memory 1503 access amongst the processor(s) 1501, interfaces and internal storage elements that may proximately arise in time with respect to one another.

One or more I/O devices 1508 are also implemented in a typical computing system. I/O devices generally are responsible for transferring data to and/or from the computing system (e.g., a networking adapter); or, for large scale non-volatile storage within the computing system (e.g., hard disk drive). ICH 1505 has bi-directional point-to-point links between itself and the observed I/O devices 1508.

In the foregoing specification, the invention has been described with reference to specific exemplary embodiments thereof. It will, however, be evident that various modifications and changes may be made thereto without departing from the broader spirit and scope of the invention as set forth in the appended claims. For example, it should be understood that one or more of the circuits of the selector or inline converters may be combined or the functionality provided by a single circuit divided up among multiple circuits. Alternative embodiments of a converter and selector may be used so long as power may be supplied from one component to another over existing power pins. Other devices other than a selector may also be used to provide power and communication with a converter. For example, if an HDTV were to have similar power monitoring and communications capabilities it too could power the circuitry of a connector. Additionally, while many of the described embodiments discussed the use of the HDMI format, the techniques of inline signal conversion and power supply over a cable to inline signal conversion circuitry will be applicable to future digital and analog formats including the conversion of HDMI into a another single A/V stream format. It should be noted that HDMI cables that allow bi-directional communication and power throughput are not compliant with the current HDMI standards.

We claim:

1. An inline converter comprising:
    a video decoder to convert an analog or digital video of a different format and standard into digital video signals;
    an audio receiver to convert audio signals from one format to a digital audio stream;
    an encoder to encode the digital video signals and digital audio stream into a single digital A/V stream;
    a microcontroller to control the operation of the video decoder, audio receiver, and encoder; and
    a power circuit to provide power to the video decoder, audio receiver, microcontroller, and encoder, wherein the power circuit receives its power from another device over an existing power pin.

2. The inline converter of claim 1, wherein the single digital A/V stream is an HDMI stream.

3. The inline converter of claim 1, further comprising:
    a video data mapping circuit active switch to arrange the output of the video decoder into a proper format for the encoder circuit.

4. The inline converter of claim 1, wherein the analog video is one of composite, component, S-video, and VGA.

5. The inline converter of claim 1, wherein the digital video is DVI.

6. An apparatus comprising:
    a audio/video decoder to convert a digital A/V stream into a digital stream of a different format and standard into digital video signals;
    an encoder to encode the digital video signals into separate digital or analog video and audio streams;
    a microcontroller to control the operation of the audio/video decoder and encoder; and
    power circuit provide power to the video decoder, microcontroller, and encoder, wherein the power circuit receives its power from another device over an existing power pin.

* * * * *